United States Patent [19]
Honold

[11] Patent Number: 5,536,076
[45] Date of Patent: Jul. 16, 1996

[54] END OF TRAIN RAILROAD AIR HOSE

[76] Inventor: David P. Honold, 1849 Harvard Ave., Terrytown, La. 70056

[21] Appl. No.: 376,793

[22] Filed: Jan. 23, 1995

[51] Int. Cl.[6] ................................................. B60T 11/26
[52] U.S. Cl. ................................ 303/86; 116/55; 188/1.11
[58] Field of Search ........................... 303/86, 1, 81, 303/68, 69; 188/1.11; 285/43; 248/53; 213/1; 246/167 R, 169 R, 217; 73/121; 116/55, 70

[56] References Cited

U.S. PATENT DOCUMENTS

| | | | |
|---|---|---|---|
| 622,750 | 4/1899 | Bane | 303/86 |
| 758,427 | 4/1904 | De Camp | 303/86 |
| 767,272 | 8/1904 | Harris | 116/55 |
| 790,808 | 5/1905 | Shaw | 116/55 |
| 918,470 | 4/1909 | Powers | 303/86 |
| 959,123 | 5/1910 | Dukesmith | 303/86 |
| 982,714 | 1/1911 | Gilfus | 303/86 |
| 1,001,084 | 8/1911 | Sauvage | 303/86 |
| 1,648,215 | 11/1927 | Bickel | 303/86 |
| 1,700,385 | 1/1929 | Stern | 303/86 |
| 2,855,247 | 10/1958 | Thompson | 303/86 |
| 3,497,270 | 2/1970 | Sauthoff et al. | 303/89 |
| 3,927,917 | 12/1975 | Falke | 303/68 |
| 4,463,991 | 8/1984 | Huber et al. | 303/69 |
| 4,986,500 | 1/1991 | Campbell | 248/53 |
| 5,211,698 | 5/1993 | Winfrey | 303/86 |
| 5,267,473 | 12/1993 | Bezos et al. | 73/129 |

Primary Examiner—Douglas C. Butler
Attorney, Agent, or Firm—Joseph N. Breaux

[57] ABSTRACT

An end of train railroad air hose having audible warning device which is powered by air from the air brake line and is actuated by the operator from the end of the train. The audible warning device may be located remotely from the operator via an elongated flexible conduit.

16 Claims, 4 Drawing Sheets

END OF TRAIN RAILROAD AIR HOSE

TECHNICAL FIELD

The present invention relates to end of train audible warning devices and, in particular, to end of train audible warning devices which have an audible warning generating device which is positionable away from the operator.

BACKGROUND ART

Backing a railroad train is a dangerous undertaking. Because the engineer operating the locomotive is often unable to even see the last railway vehicle composing the train, a railroad employee is stationed on the rear vehicle and communicates with the engineer as the train is backed. The last vehicle in each train is equipped with a brake control and an audible warning device. The brake control and audible warning device are both operated by the employee stationed on the last vehicle to warn vehicles and pedestrians of the backing train, as well as, applying the brakes in an emergency.

Railway vehicles are generally equipped with indirect air braking systems. These indirect air braking systems require a positive air pressure within the railway vehicles brake lines to disengage the brakes. The use of indirect braking is beneficial for various reasons. One reason is the brakes may be actuated at various points along a train of railway vehicles, in particular the last railway vehicle, simply by venting air from the brake line.

To accomplish this braking, the railroad industry uses an end of train railroad air hose assembly attached to the end car of a train. The railroad air hose assembly generally includes a coupling, connectable to the brake line of the last railway vehicle; a hose, connected to the coupling; and an exhaust valve in line with the hose in a manner such that positioning the valve in the closed position prevents the escape of air from the brake line and opening the valve allows sufficient air to escape from the brake line to cause the railway vehicle's brakes to engage. The air hose assembly is portable, and is installed on the last railway vehicle as cars are added and removed from the train in the railway switching yard and along the train's route.

Commercially available end of train railroad air hoses include an air driven whistle connected to the hose portion of the railroad air hose adjacent the control arm of the exhaust valve. The air driven whistle is actuated by opening a valve rigidly affixed between the hose portion and the air driven whistle. This allows the person stationed on the last vehicle to provide a warning and eliminates the need for an additional source of power for the warning device.

Although providing an air driven whistle eliminates the need for an additional power source, the whistles are generally not as loud as would be desirable because of the close proximity to which the person operating the whistle is located when the whistle is actuated. It would be desirable, therefore, to have a portable, easily connected, end of train railroad air hose which had an audible warning output sufficient to warn other vehicles and pedestrians at longer distances than the existing air driven whistles.

In addition, persons unfamiliar with the sound of the air driven whistle often do not associate the sound with an audible warning coming from a moving train. It would, therefore, be an additional benefit if the sound generated by the audible warning device was easily associated with a moving train.

GENERAL SUMMARY DISCUSSION OF INVENTION

It is thus an object of the present invention to provide an improved end of train railroad air hose which is a portable, easily connected to the brake line air hose of a railway vehicle and which has an audible warning output sufficient to warn other vehicles and pedestrians at greater distances than existing railroad air hoses.

It is a further object to provide an improved end of train railroad air hose which has an audible warning device which creates an audible warning easily associated with a moving train.

Accordingly, an improved railway air hose of the type that is connectable to the air brake line of a railway vehicle, and has an air conduit in connection with a venting valve having a venting aperture of a size sufficient to exhaust sufficient air from the railway vehicle air brake line to engage the railway vehicle braking system is provided. The improvement comprises: the addition of a valve having an inlet aperture and an outlet aperture with a controllable block; an air driven audible warning device with an air supply inlet; and an elongated flexible conduit member having a first and second end connected by an air passageway.

The inlet aperture is functionally connected to the air conduit. The first end of the elongated flexible conduit is functionally connected to the outlet aperture. The second end of the elongated flexible conduit is functionally connected to the air supply inlet of the air driven audible warning device. The elongated flexible conduit is of a length sufficient to allow placement of the air driven audible warning device at least three feet from the valve.

In a preferred embodiment, the audible warning device includes an attachment mechanism for attaching the air driven audible warning device to a railway vehicle. The audible warning device preferably includes a hooked portion.

In another preferred embodiment, the attachment mechanism includes a metal sheet having an angular bend therein forming a first and second leg section. The first leg section is fastened to the audible warning device. The second leg section extends away from the audible warning device in a manner to form an open cavity between the audible warning device and the second leg section. The first leg section may be fastened to a base portion of the audible warning device by any method known in the art, however, the first leg section is preferably bolted or welded to the audible warning device.

The audible warning device is preferably a single chime locomotive air horn.

The valve is preferably a piston type valve, operable by a finger of an operator.

The first end of the elongated flexible conduit member may be connected to the outlet aperture with any connector type known in the art, however, the connection is preferably made with an air hose quick disconnect.

The second end of the elongated flexible conduit member may be connected to the air inlet of the audible warning device with any connector type known in the art, however, the connection is preferably made with an air hose quick disconnect.

The elongated flexible conduit member is preferable of a length between three and fifteen feet.

In another preferred embodiment, the railway air hose further includes a pressure measuring device in functional connection with the air conduit.

In another preferred embodiment, the valve includes an aperture with internal threads; the pressure measuring device has an externally threaded inlet aperture; and the externally threaded inlet aperture is threaded into the aperture with internal threads. The pressure measuring device is preferably a pressure gauge with a range from zero to one hundred twenty pounds per square inch.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
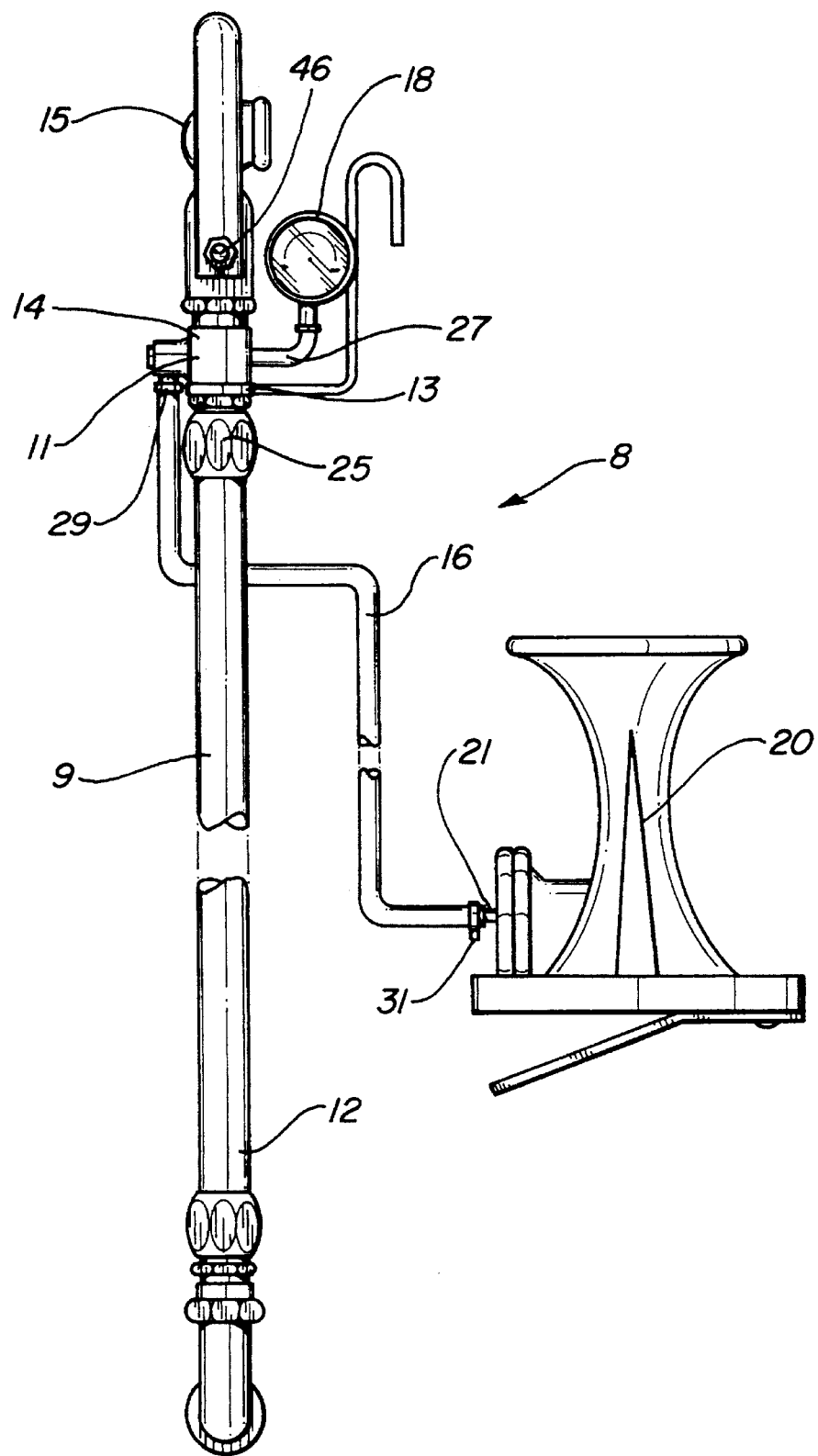
FIG. 1 is a side view of an exemplary embodiment of the improved end of train, railway air hose assembly of the present invention.

Referring now to the figures, and in particular to FIG. 1, there is shown an exemplary embodiment of the improved end of train, railway air hose of the invention, generally referred to by the numeral 8. Railway air hose 8 includes an air hose assembly 9, an operator actuated audible warning device assembly 11 having a pressure gauge 18, and a venting apparatus 15.

Figure 2:
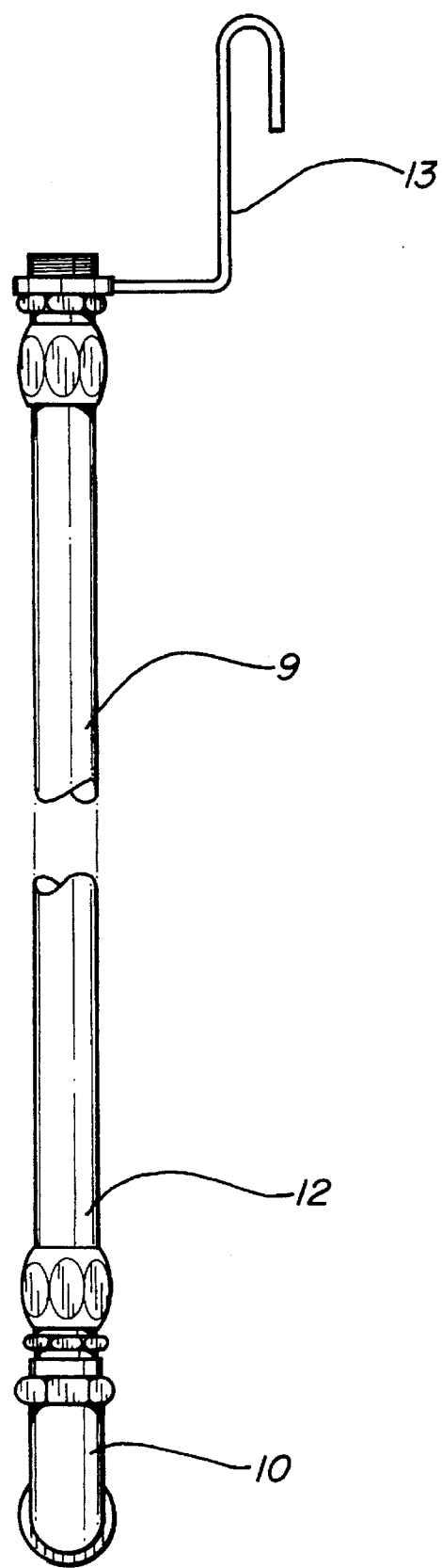
FIG. 2 is a side view of the air hose assembly.

Air hose assembly 9, shown in isolation in FIG. 2, includes a standard glad-hand 10, a flexible hose 12 having an outside diameter of ⅞ inch and a length of about eight feet, and a hook 13 for hanging the assembly on the railway vehicle. Glad-hand 10 provides for a quick and positive connection of the air hose 12 to the air brake hoses (not shown) of adjacent railway vehicles.

Figure 3:
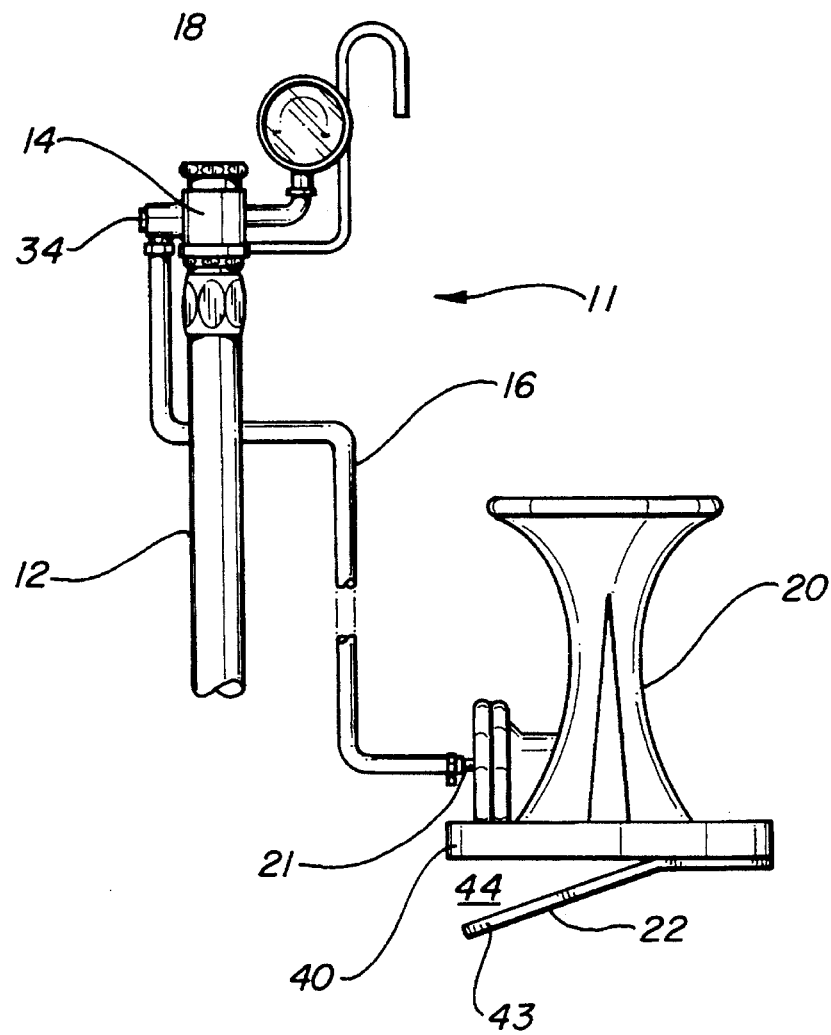
FIG. 3 is a side view of the remotely positionable operator actuated air driven audible warning device.

As shown in FIG. 3, warning device assembly 11 includes a button valve 14, an elongated flexible conduit 16 with a diameter of ¼ inch and a length of about eight feet, an air pressure gauge 18 with a range from 0 to 120 psi, and a single chime locomotive air horn 20, with an air supply inlet aperture 21, having an audible output when connected to a pressurized air source and a bracket 22.

Figure 4:
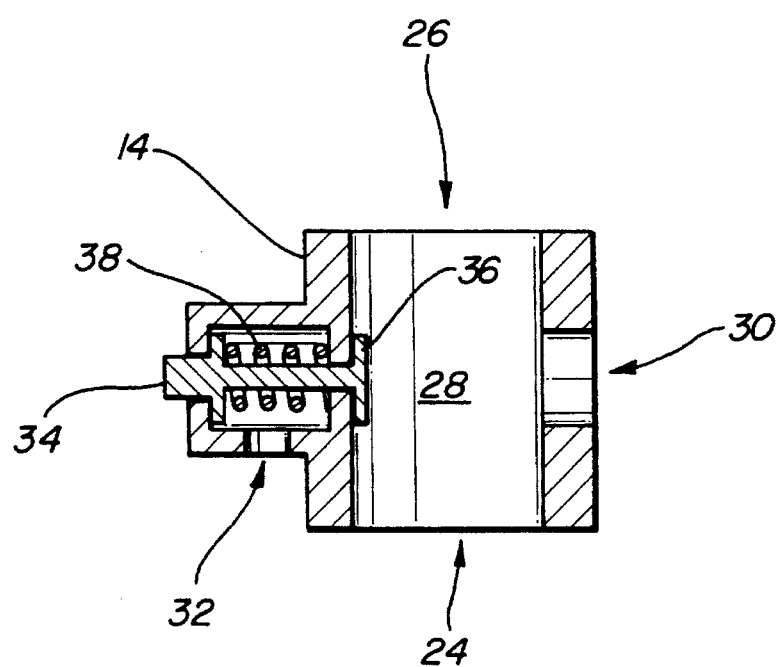
FIG. 4 is a cut away view of a manually operated blocking valve.

Button valve 14, as shown in FIG. 4, includes two apertures 24, 26, a passageway 28, a pressure gauge aperture 30, an outlet aperture 32, a button 34, a piston 36, and a spring 38. Apertures 24 and 26 have an inside diameter of ⅞ inch, and are internally threaded. Pressure gauge aperture 30 and outlet aperture 32 have inside diameters of ¼ inch, and are internally threaded. Button 34 when depressed urges piston 36 into passageway 28 allowing air to pass through outlet aperture 32. When the force depressing button 34 is removed, spring 38 reseats piston 36 blocking the passage of air through outlet aperture 32.

Figure 5:
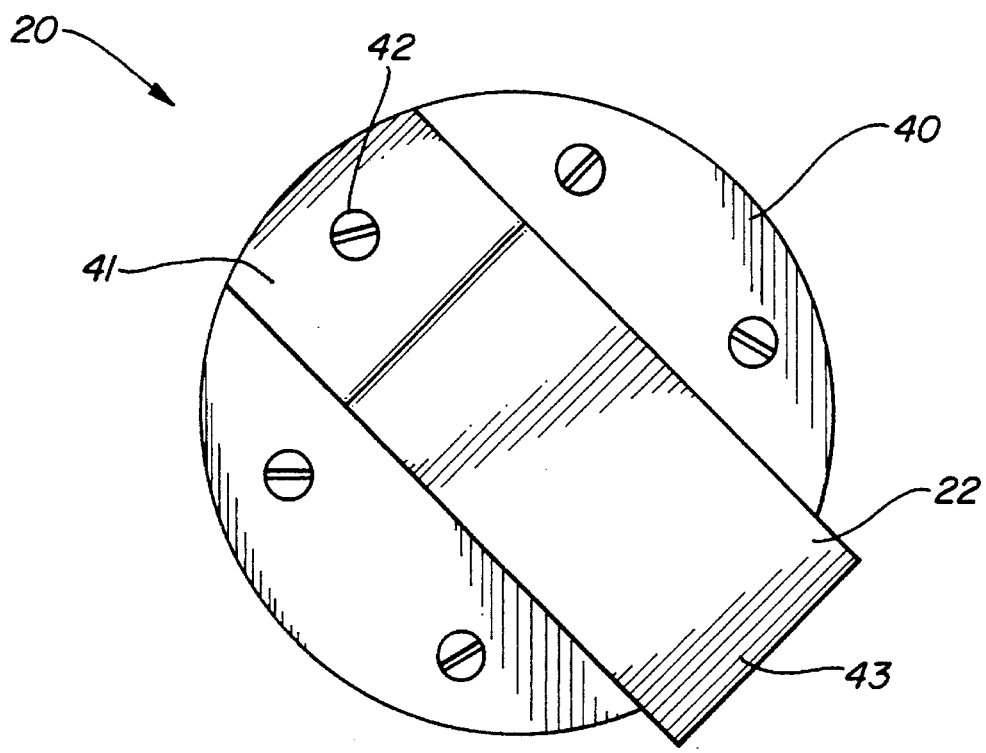
FIG. 5 is a rear view of the single chime locomotive air horn with a base mounted bracket.

Bracket 22, shown in FIG. 5, is a ¼ inch metal sheet having an angular bend therein forming a first and second leg section 41, 43. First leg section 41 is approximately 4 inches in length and is mounted flush with a base portion 40 of locomotive air horn 20 by means of a conventional bolt 42. Second leg section 43 is approximately 10 inches in length and extends away from base 40 at approximately a 30 degree angle forming a cavity 44, shown in FIG. 3, between base 40 and second leg 43.

Figure 6:
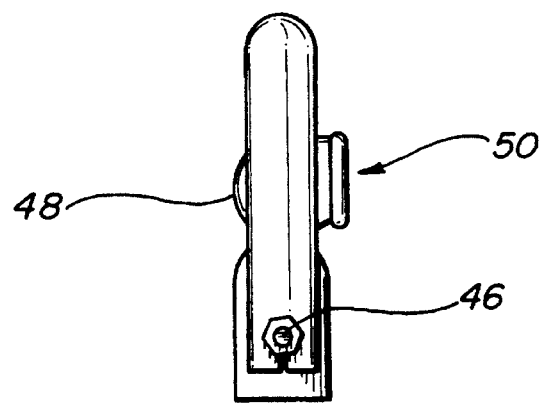
FIG. 6 is a side view of the venting valve and venting aperture.

The venting apparatus 15, as shown in FIG. 6, includes a 1 inch ball valve 46 and a 90 degree elbow 48 with an aperture 50 of a sufficient diameter to allow venting of air at a rate sufficient to engage the braking system.

With reference once again to FIG. 1, air hose 12 is connected to aperture 24 of button valve 14 by male/female threaded coupling 25, placed over the male connector is hook 13 to allow the railway air hose 11 to be attached to the side of a railway vehicle. Ball valve 46 is threaded to aperture 26 of button valve 14. An externally threaded inlet port 27 of pressure gauge 18 is connected to aperture 30. Flexible conduit 16 is connected to outlet aperture 32 by ¼ inch barbed hose connection fitting 29. The other end of flexible conduit 16 is connected to inlet aperture 21 by ¼ inch barbed hose connection fitting 31, providing air horn 20 a source of pressurized air.

Use of the exemplary embodiment of the improved end of train railroad air hose is now described with reference to FIG. 1. Railroad air hose 8 is attached the brake line of the last railway vehicle using glad hand 10 as in the prior art devices. Hook member 13 is attached to a convenient location on the last railway car second leg 43 of bracket 22 is placed over another portion of the last railway vehicle at another location, preferably a distance equal to the length of flexible conduit 16 away from button valve 14. Operation is identical to the prior art devices. When doing brake line air pressure tests, the person need only look at attached air pressure gauge 18 to determine if the air pressure within the brake lines is within required limits.

It can be seen from the preceding description that an improved end of train railroad air hose which is a portable, easily connected to the brake line air hose of a railway vehicle, which has an audible warning output sufficient to warn other vehicles and pedestrians at greater distances than existing railroad air hoses, and which creates an audible warning easily associated with a moving train has been provided.

It is noted that the embodiment of the end of train railroad air hose described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. In a railway air hose that is connectable to an air brake line of an air braking system of a railway vehicle, and that has an air conduit member in connection with a venting valve that includes a venting aperture of a size sufficient to exhaust sufficient air from said air brake line of said railway vehicle when said railway air hose is connected said air brake lines of said railway vehicle to engage said braking system when said venting valve is positioned in a venting position allowing air to pass between said air conduit member and said venting aperture, an improvement comprising:

a) a warning device actuation valve having an inlet aperture and an outlet aperture with a controllable block, said controllable block being positionable in a first position to allow the passage of air between said inlet aperture and said outlet aperture and positionable in a second position to block passage of air between said inlet aperture and said outlet aperture;

b) an air driven audible warning device with an air supply inlet port;

c) an elongated flexible conduit member having a first and second end connected by an air passageway;

said inlet aperture being connected to said air conduit member in a manner such that air contained within said air conduit member communicates unimpeded with air contained within said inlet aperture, said first end of said elongated flexible conduit member being connected to said outlet aperture of said warning device actuation valve in a manner such that air contained within said elongated flexible conduit member communicates unimpeded with air contained within said outlet aperture and said second end of said elongated flexible conduit member being connected to said air supply inlet port of said air driven audible warning device in a manner such that air contained within said elongated flexible conduit member communicates unimpeded with air contained within said air supply inlet port of said air driven audible warning device, said elongated flexible conduit member being of a length sufficient to allow placement of said air driven audible warning device at least three feet from said warning device actuation valve.

2. The railway air hose of claim 1, wherein:

said audible warning device includes attachment means for attaching said air driven audible warning device to said railway vehicle.

3. The railway air hose of claim 2, wherein:

said attachment means includes a metal sheet having an angular bend therein forming a first and second leg section, said first leg section being fastened to said audible warning device, said second leg section extending away from said audible warning device in a manner to form an open cavity between said audible warning device and said second leg section.

4. The railway air hose of claim 3, wherein:

said first leg section is fastened to a base portion of said audible warning device.

5. The railway air hose of claim 3, wherein:

said first leg section is bolted to said audible warning device.

6. The railway air hose of claim 2, wherein:

said attachment means includes a hook.

7. The railway air hose of claim 1, wherein:

said audible warning device is a single chime locomotive air horn.

8. The railway air hose of claim 1, wherein:

said warning device actuation valve is a piston type valve.

9. The railway air hose of claim 1, wherein:

said warning device actuation valve is operable by a finger of an operator.

10. The railway air hose of claim 1, wherein:

said first end of said elongated flexible conduit member is connected to said outlet aperture by an air hose quick disconnect.

11. The railway air hose of claim 1, wherein:

said second end of said elongated flexible conduit member is connected to said air inlet of said audible warning device by an air hose quick disconnect.

12. The railway air hose of claim 1, wherein:

said elongated flexible conduit member is of a length between three and fifteen feet.

13. The railway hose of claim 1, further including a pressure measuring device in connection with said air conduit member in a manner such that air contained within said air conduit member enters said pressure measuring device from said air conduit member.

14. The railway air hose of claim 13, wherein:

said warning device actuation valve includes a pressure measuring device receiving aperture with internal threads; said pressure measuring device has an externally threaded inlet aperture member; and said externally threaded inlet aperture member is threaded into said pressure measuring device receiving aperture with internal threads.

15. The railway air hose of claim 13, wherein:

said pressure measuring device is a pressure gauge with a range from zero to one hundred twenty pounds per square inch.

16. The railway air hose of claim 13, wherein:

said audible warning device includes attachment means for attaching said air driven audible warning device to said railway vehicle, said attachment means includes a metal sheet having an angular bend therein forming a first and second leg section, said first leg section being fastened to said audible warning device, said second leg section extending away from said audible warning device in a manner to form an open cavity between said audible warning device and said second leg section, said first leg section is fastened to a base portion of said audible warning device, said first leg section being bolted to said audible warning device, said audible warning device being a single chime locomotive air horn, said warning device actuation valve is operable by a finger of an operator, said first end of said elongated flexible conduit member is connected to said outlet aperture by an air hose quick disconnect, said second end of said elongated flexible conduit member is connected to said air inlet of said audible warning device by an air hose quick disconnect, said elongated flexible conduit member is of a length between three and fifteen feet, and said pressure measuring device is a pressure gauge with a range from zero to one hundred twenty pounds per square inch.

* * * * *